United States Patent Office 3,377,685
Patented Apr. 16, 1968

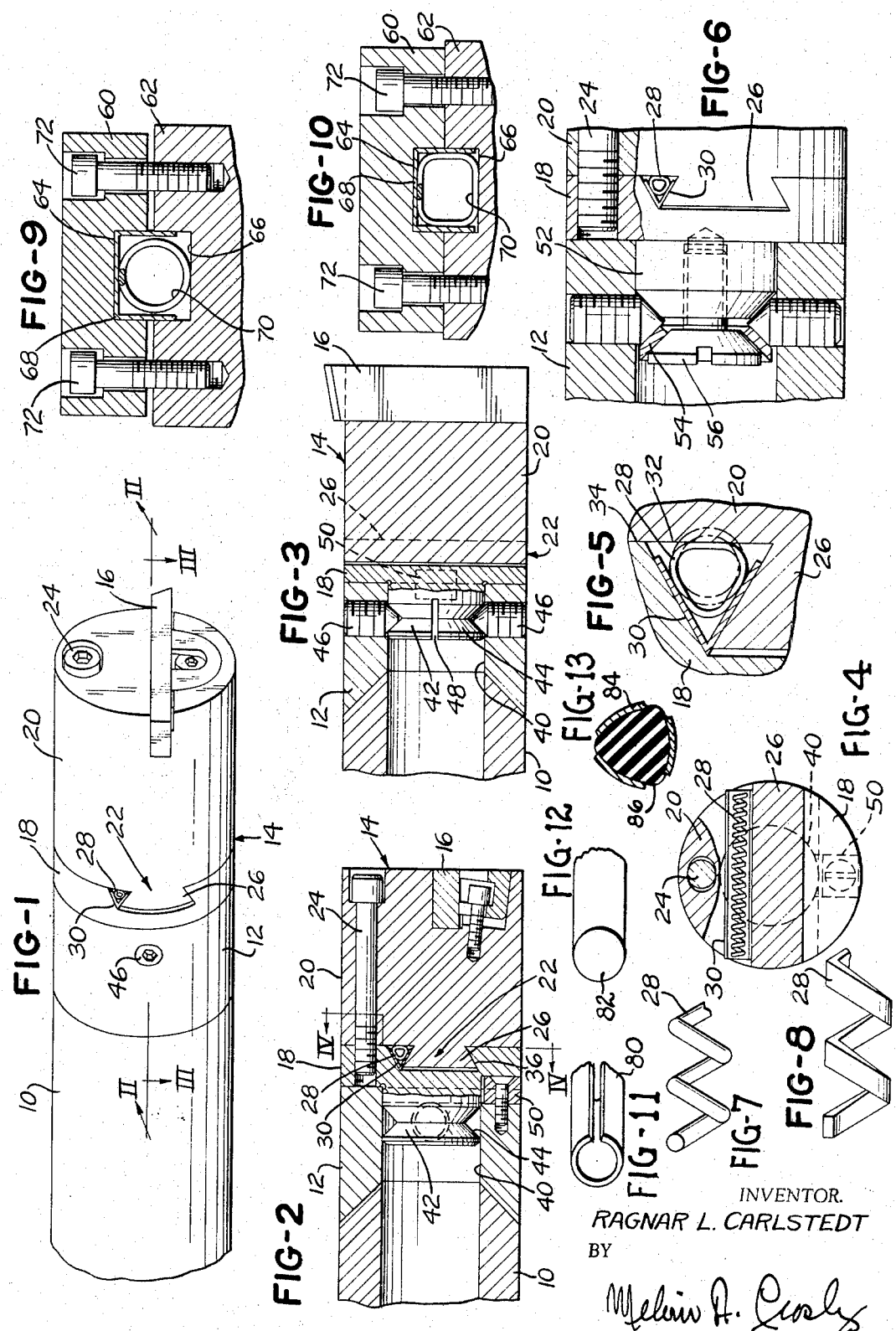

3,377,685
GUIDE ARRANGEMENT FOR RELATIVELY
MOVEABLE PARTS
Ragnar L. Carlstedt, Ligonier, Pa., assignor to Kennametal, Inc., Latrobe, Pa., a corporation of Pennsylvania
Filed Dec. 2, 1965, Ser. No. 511,114
12 Claims. (Cl. 29—200)

This invention relates to guide arrangements for relatively moveable or relatively adjustable parts.

In many cases, in machine tools and the like, it will occur that two parts will be found which are slidably guided on one another and which are to be clamped into positions of adjustment relative to each other. It is common in connection with such interfitting relatively adjustable parts to form elements or an interfitting slide means on said parts. For example, a dove-tail groove may be formed in one part and a dove-tail formed on the other extending into the groove so that the parts are guided in their relative movement and can be fixedly clamped in place in any position of relative adjustment. In other cases, square slides might be provided in which a square groove is formed in one part and a square tongue is provided on the other part extending into the groove.

In every case wherein interfitting elements of guideways are formed on the parts, highly accurate machining practices must be observed and, at the best, there is a relatively poor fit of the guide elements with each other. In most cases where it is desired for the parts to be accurately guided on one another, auxiliary tapered gibs or the like are provided extending between the interfitting elements and adjustable for eliminating lost motion therebetween. Even where adjustable gibs are provided highly accurate machining practices must be observed in order to get the angularly related interengaging surfaces into good contact with each other.

With the foregoing in mind, the present invention is particularly concerned with a novel arrangement whereby the guiding of one part on another can be accomplished quite simply by interfitting guide means produced at greatly reduced machining cost while, at the same time, much more accurate relative location of the parts is realized when they are clamped together.

Still further, the present invention effects better interengagement of the mating surfaces of the parts thereby inhibiting wear and providing for more secure clamping of the parts together when they are in the proper positions of relative adjustment.

Still further the present invention proposes the provision of a guiding and locating arrangement of the nature described which is widely adaptable to varying circumstances and which can be used, in particular, in connection with the adjustment of the moveable head of a boring bar or the like on the supporting member therefor.

The exact nature of the present invention and the several objects and advantages thereof will become more apparent upon reference to the following detailed specification taken in connection with the accompanying drawings in which:

FIGURE 1 is a somewhat diagrammatic perspective view of a boring bar embodying the present invention;

FIGURE 2 is a fragmentary longitudinal section to the boring bar indicated by line II—II on FIGURE 1;

FIGURE 3 is a section taken at right angles to FIGURE 2 and is indicated by line III—III on FIGURE 1;

FIGURE 4 is a sectional view indicated by line IV—IV on FIGURE 2;

FIGURE 5 is a somewhat enlarged fragmentary cross-section showing important elements of the structure of the present invention;

FIGURE 6 is a sectional view similar to FIGURE 3 and drawn at somewhat enlarged scale and showing a modification;

FIGURES 7 and 8 are fragmentary views showing two types of spring elements that can be used according to the present invention;

FIGURE 9 is a sectional view showing how the present invention can be adapted to square guide arrangements and with the two parts unclamped;

FIGURE 10 show the arrangement of FIGURE 9 with the parts tightly clamped together; and FIGURES 11, 12 and 13 show modifications of the spring element.

Referring to the drawings somewhat more in detail, FIGURE 1 shows a boring bar of which the shank 10 may be cemented tungsten carbide, for example, and having at the outer end thereof a steel portion 12 which may be brazed or cemented on the end of the tungsten carbide shank 10. Portion 12 has mounted thereon an adjustable head 14, also steel, which carries a cutting element 16.

The head 14 is adjustable on portion 12 laterally of the bar in order to effect positioning of the cutting element 16 at the proper radial location on the holder. For the purpose of permiting latteral adjustment of the cutting tool 16 on the bar, head 14 is formed in two parts as will be seen in FIGURE 2. These two parts consist of a first part 18 adjacent member 12 and a second part 20 in which the cutting element 16 is mounted. A dove-tail like slide arrangement generally indicated at 22 interconnects parts 18 and 20 and there may furthermore be provided between parts 18 and 20, although not illustrated in the drawings, any suitable well known micrometer adjusting arrangement and by means of which part 20 can be finely adjusted relative to part 18.

The part 20 has a slot therein through which a clamp screw 24 extends and which is threaded into part 18 so that by tighting clamp screw 24 the two parts 18 and 20 can be fixedly clamped together.

The particular feature of the present invention is to be found in the formation of the interfitting parts of the dove-tail like slide 22. As will be seen in FIGURE 2, particularly taken in connection with FIGURES 4 and 5, the part 20 is formed with a dove-tail extension 26. The part 18 however is formed with a groove for receiving extension 26 which is dove-tailed on one side but in which the other side diverges at an angle from the inclined surface of extension 26 and may be, in fact substantially parallel to the opposite side of the groove.

As will be seen in FIGURE 5, in the triangularly shaped space formed between said other side wall of the groove formed in part 18 and the adjacent inclined wall of the extension 26 of part 20, there is positioned a coiled spring 28. Preferably, the spring is received in a hardened V-shaped trough member 30. The spring 28 may be a coil spring formed of round wire as illustrated in FIGURE 7, or it may be a coil spring formed of flat wire as illustrated in FIGURE 8. Spring 28 may be relatively closely coiled or it may be a fairly open spring as shown in FIGURES 7 and 8.

In any case, spring 28 forms a deformable compression member of such a size that it is in engagement with both sides of the thin hardened metal trough member 30 and with the flat surface 32 on the back of part 20 before clamp screw 24 is tightened. After clamp screw 24 is tightened so as to draw flat surface 32 of part 20 against flat surface 34 of part 18, the spring element is deformed and is compressed between the two sides of metal trough member 30 and surface 32 of part 20 so that the spring will exert substantial lateral force on part 20 and force it toward the other side of the dove-tail.

When screw 24 is tightened up, therefore, the parallel interfitting sides of the dove-tail are pushed into good bearing engagement with each other and this will, in turn, pull part 20 tightly against the flat end surface 34 of part 18 at the side where the dove-tails interfit. The clamp screw 24 itself, on the other hand, will draw the parts tightly together on the side of the dove-tail where the spring 28 is located.

It will be evident that the flat surfaces 32 and 34 on the interfitting ends of parts 18 and 20 must be accurately formed but this is a relatively simple machining operation. Further, the interfitting sides of the dove-tail, indicated by reference numeral 36 in FIGURE 2 must also be accurately formed but this is likewise a relatively simple machining operation.

At the other side of the dove-tail, where the metal trough 30 and the spring 28 are inserted, the surfaces need not be machined with the same degree of accuracy either as to surface finish or location or angularity and there is no need for closely fitting the dove-tail into the groove. Furthermore, there is absolutely no need for the provision of a tapered gib or the like. At any time the parts 18 and 20 are clamped together by tightening the screw 24, the part 20 will be accurately and firmly seated on part 18 and there will be absolutely no lost motion therebetween.

The arrangement according to the present invention thus eliminates the need for highly accurate machining of interfitting grooves and dove-tails and thus makes it more inexpensive to construct the guiding means while, at the same time, superior results are obtained because the parts are clamped together with no lost motion therebetween and with all interfitting surfaces in good bearing engagement with each other.

I have found that no loss of load carrying capacity is present in the arrangement of this invention and that when the parts 18 and 20 are clamped together by tightening of the clamp screw the assembly if fully as rigid as if the groove and dove-tail were made in the conventional manner and included a close fitting adjustable gib. Inasmuch as no loss of load carrying capacity is to be found and greater accuracy of clamping is present and machining cost is lower it will be evident that the present invention represents an advance in this particular art.

The securing of head 14 to part 12 can be accomplished by providing part 12 with a bore 40 into which extends a cylindrical projection or pin portion 42 formed on the back of member 18. Pin portion 42 is provided with a V-shaped annular notch 44 therein and threaded into part 12 are a pair of cone point set screws 46 which points engage the said groove. Pin 42 may be slotted as at 48 if so desired so that it can form a tight fit in bore 40. A key 50 is preferably provided effecting positive interconnection of parts 12 and 18 so that the assembly will adequately sustain torque loads without any slipping of the head on the supporting bar.

FIGURE 6 shows an advantageous arrangement of the connection between the head and the bar and wherein the pin portion formed on the back of the one part of the head and indicated at 52 has only one-half of the V-notch formed thereon. The other half of V-notch is formed by a hardened dish-shaped washer 54 retained in place by the head 56 of a screw that is threaded into the end of the pin portion 52. The principal load on the V-shaped groove will, of course, be found on the back thereof and the arrangement of FIGURE 6 provides for some adjustment of the location of washer 54 and, inasmuch as the said washer is hardened, the wear thereof will take place slowly and this member can always be replaced if desired.

The invention as so far been described in connection with a V-shaped guideway but it will be evident upon reference to FIGURES 9 and 10 that the principle of the deformable spring is also adaptable to guideways of other shapes as well.

In FIGURES 9 and 10, the part 60 is adjustably mounted on part 62. The parts are guided relative to each other by the provision of a guideway therebetween which consists of rectangular recess 64 in part 60 and rectangular recess 66 in part 62. Disposed in one of the rectangular recesses, for example, recess 64 of part 60 is a rectangular hard metal trough 68 which has the ends of its legs extending relatively deeply into groove 66.

Contained within the metal trough is a coil spring 70 which performs the same function as the aforementioned spring 28 described in connection with a first modification. Spring 70, before the parts 60 and 62 are clamped together and are somewhat spaced apart, bears on the bottom of groove 66 and on the bottom and sides of the metal trough 68. The parts, when unclamped can be adjusted longitudinally of each other the direction of the length of the guideway and will be guided thereby so as to be fairly accurately located laterally. Upon tightening up of clamp screws 72 however, the parts will be drawn toward each other and the spring 70 will be compressed and will press outwardly against the sides of the trough 68 and will push these sides against the sides of the grooves 64 and 66 and will thus accurately locate parts 60 and 62 relative to each other.

It will be evident that the metal trough 68 in FIGURES 9 and 10 has a slightly different function than the metal trough 30 in the first described modification. In the first described modification the side walls of the metal trough are for the purpose of transmitting thrusts laterally to the members 18 and 20. In FIGURES 9 and 10 however the legs of the metal trough actually effect the alignment of parts 60 and 62 by bearing laterally on the walls of the groove. If one part is shifted laterally slightly relative to the other part, as the screws 72 are tightened up, it will be forced in a direction to effect exact alignment of the parts with each other. It will be noted that the bearing points of the spring 70 inside the metal trough are substantially directly opposite the regions of the metal trough where the parts 60 and 62 come together so that the most efficient application of the spring force to effect alignment of the parts as they are clamped up can be effected.

From the foregoing it will be evident that the present arrangement provides a simplified and relatively inexpensive arrangement for effecting the locating of two parts to be clamped together and likewise provides a guide means for guiding the parts when they are shifted relatively to each other. The act of clamping the parts together by forcing them toward each other effects the alignment of the parts and, in the case of the first described arrangement also thrusts the infitting surfaces of the parts, at least on the one side of the dove-tail, into firm engagement with each other. The forming of the guideways on the parts is relatively inexpensive and highly accurate machining practices do not need to be observed in the practice of the present invention.

It will be appreciated that the spring element employed need not be a coiled spring but could take the form of a rod or block of rubber-like material if so desired. Still further, in cases where the two main members do not slide relatively any substantial amount, the metal trough about the spring element could be eliminated without any loss of effectiveness or the spring element. The metal trough, or the equivalent thereof, could also be attached to the spring element to form a single unit. This could be done particularly easily when the spring element was in the form of a rubber-like rod or bar. In such a case, the metal element or elements disposed between the spring element and the main members could take the form of a trough or strip bonded to the rubber-like rod or bar.

In any case, spring elements other than round in cross-section could be employed where particular conditions indicated the desirability of a spring element of this nature.

In addition to coiled springs and rod or bar spring elements of rubber-like material, the possibility exists of using spring elements made like roll pins, namely, in the form of a split cylinder of spring material such as metal.

It will be perceived that the important characteristic for the spring element to possess is that of lateral resilience while longitudinal resilience is not essential. Coiled springs are of advantage for economic reasons and because they are inherently laterally resilient but the longitudinal resilience thereof is without significance in respect of the present invention.

Examples of the foregoing are shown in FIGURES 11, 12 and 13. In FIGURE 11, a slit sleeve spring element 80 is shown. In FIGURE 12, a spring element in the form of a rod or bar 82 of rubber-like material is shown.

In FIGURE 13, a spring element is shown which is not round in cross-section and wherein metal strips 84 are shown attached to member 86 which forms the spring element.

It will be understood that this invention is susceptible to modification in order to adapt it to different usages and conditions; and accordingly, it is desired to comprehend such modifications within this invention as may fall within the scope of the appended claims.

What is claimed is:

1. In combination: first and second relatively moveable members; clamp means associated with said members for clamping said members together, interengaging sliding surfaces on said members, cooperating elements of guide means formed on said members within the range of said surfaces for guiding the said members upon relative movement thereof when said clamp means is loosened and for effecting accurate location of said members when said clamp means is tightened, said guide means including a pocket extending in the direction of relative movement of said members and having side wall portions formed on both of said members, said pocket having at least one open side facing one of said members, a spring resilient in at least the lateral direction thereof in said pocket extending in the direction of the length of the pocket and of such a size in cross-section as to bear on said side wall portions of said pocket and on said one member when said clamp means is loosened whereby tightening of said clamp means will cause compression of said spring laterally of said pocket and develop lateral thrust on said side wall portions.

2. The combination according to claim 1 in which said spring is a rod or bar-like element so as normally to have a limited region of contact with each said side wall portion of said groove and with said one member when viewed in the direction of the length of said spring.

3. The combination according to claim 2 in which said spring is rubber-like material.

4. The combination according to claim 2 in which said spring is a coiled spring.

5. The combination according to claim 2 in which said pocket is triangular and a first wall thereof is formed by said one member and a second wall thereof is formed by the other of said members, and the third side of said pocket is open and is confined by said one member.

6. The combination according to claim 2 in which said pocket is rectangular and is made up of aligned rectangular recesses in said members opening toward each other.

7. The combination according to claim 5 in which a V-shaped metal trough is disposed in said pocket between said spring and said first and second walls of said pocket.

8. The combination according to claim 5 in which said elements are in the form of a dove-tail projection on said one member and a groove in the other member receiving said projection and having one side wall engaging one side wall of said projection and the other side wall of said groove diverging from the adjacent side wall of the projection in a direction toward said one member thereby to form the said pocket in which said spring is disposed.

9. The combination according to claim 2 in which said clamp means comprises screw means screw threadedly engaging one of said members and extending through slot means in the other of said members.

10. The combination according to claim 6 in which a rectangular metal trough is disposed in one of said recesses and has the leg portions extending into the other recess, said spring being confined by the sides and bottom of said trough and the bottom of said other recess and having its region of engagement with the sides of said trough in the region of the plane of said sliding surfaces.

11. The combination according to claim 2 in which one of said members has a cylindrical support pin projecting from one side, a support member with a bore to receive said pin, an annular V-shaped groove in said pin, and cone pointed screw means in said support member engaging said V-shaped groove.

12. The combination according to claim 2 in which one of said members has a cylindrical support pin projecting from one side, a support member with a bore to receive said pin, said pin having its outer end tapered, a cone headed screw in the outer end of said pin forming with said tapered end a V-shaped groove, a hard cone washer on the conical surface of the screw, and cone pointed screw means in said support member engaging said V-shaped groove.

References Cited

UNITED STATES PATENTS

| 1,580,426 | 4/1926 | Farnam. | |
| 1,643,873 | 9/1927 | Cardullo | 90—52 |
| 2,684,608 | 7/1954 | Roman | 82—37 |
| 2,975,662 | 3/1961 | Courtot. | |

THOMAS H. EAGER, *Primary Examiner.*